(12) United States Patent
Kim et al.

(10) Patent No.: US 7,050,776 B2
(45) Date of Patent: May 23, 2006

(54) MOBILE COMMUNICATION APPARATUS INCLUDING TRANSCEIVING MULTI-ANTENNAS AND MOBILE COMMUNICATION METHOD

(75) Inventors: Sung-jin Kim, Suwon (KR); Jong-hyeuk Lee, Incheon (KR); Ho-jin Kim, Seoul (KR); Yung-soo Kim, Seongnam (KR)

(73) Assignee: Samsung Electronics Co., Ltd., Suwon (KR)

( * ) Notice: Subject to any disclaimer, the term of this patent is extended or adjusted under 35 U.S.C. 154(b) by 525 days.

(21) Appl. No.: 10/277,734

(22) Filed: Oct. 23, 2002

(65) Prior Publication Data

US 2003/0060236 A1   Mar. 27, 2003

(30) Foreign Application Priority Data

Oct. 24, 2001   (KR) ............................. 2001-65670

(51) Int. Cl.
*H04B 7/00* (2006.01)
(52) U.S. Cl. .............................. 455/277.1; 455/277.2; 455/504; 370/208
(58) Field of Classification Search ............... 455/517, 455/277.1, 277.2, 562.1, 504, 65, 69, 63.1; 375/344, 366; 370/208
See application file for complete search history.

(56) References Cited

U.S. PATENT DOCUMENTS

| 6,144,711 | A | 11/2000 | Raleigh et al. |
| 8,301,470 | | 10/2001 | Kim et al. .................. 455/278 |
| 6,847,688 | B1 * | 1/2005 | Molnar et al. ............... 374/344 |
| 2001/0021236 | A1 * | 9/2001 | Song ........................ 375/366 |
| 2003/0123384 | A1 * | 7/2003 | Agee ........................ 370/208 |
| 2004/0142714 | A1 * | 7/2004 | Vishwanath et al. ........ 455/517 |

FOREIGN PATENT DOCUMENTS

| EP | 0 905 920 | 3/1999 |
| EP | 1 259 008 | 11/2002 |
| WO | WO 01/45300 | 6/2001 |
| WO | WO 01/76110 | 10/2001 |
| WO | 02/47286 | 6/2002 |

OTHER PUBLICATIONS

Siemens, "Description of the eigenbeamformer concept (update) and performance evaluation", 3GPP TSG RAN WG 1 TSGR1#19 R1-01-0203 (Feb. 27, 2001).

(Continued)

*Primary Examiner*—Sonny Trinh
*Assistant Examiner*—Phuoc Doan
(74) *Attorney, Agent, or Firm*—Lee & Morse, P.C.

(57) ABSTRACT

A mobile communication apparatus having multiple transmission antennas and multiple reception antennas and a mobile communication method used in the mobile communication apparatus, wherein a base station, which has at least one reception antenna, restores long-term and short-term information determined in consideration of first characteristics in a mobile station, which has at least one transmission antenna, from a feedback signal received from the mobile station, spatially processes dedicated physical channel signals using basis information produced from the restored long-term and short-term information, and transmits the results of addition of the spatially-processed signals to pilot signals to the mobile station, wherein the first characteristics are the characteristics of the downlink channels of the respective transmission and reception antennas. Accordingly, the feedback of long-term and short-term information from the mobile station to the base station minimizes the effects of fading, interference, and noise and maximizing throughput.

29 Claims, 15 Drawing Sheets

OTHER PUBLICATIONS

Gallager, "Information theory and reliable communication", John Wiley & Sons, XP002226283, pp. 343-354 (1968).

Golub, G., et al., "Matrix Computation", Johns Hopkins University Publishing Co., London, pp. 208-211 (1996) [Note: portion re. EVD method].

Bergmans, Jan W.M., Digital Baseband Transmission and Recording, Kluwer Academic Publishing Co., Boston, Chapter 3, Appendix 3B, p. 142, (1996) [portion re waterfilling method].

3GPP, a standardization group for a Universal Mobile Telecommunications System (UMTS), European IMT-2000 [Specification set for First & Second TxAA modes].

G. Golub et al., Matrix Computations, 1996, pp. 208-211.

3GPP, TS 25.214 V5.2.Draft (Sep. 2002), Release 5, pp. 43-51.

Gallager, "Information theory and reliable communication", John Wiley & Sons, XP002226283, pp. 343-354, (1968), no month listed.

Golub, G., et al., "Matrix Computation", Johns Hopkins University Publishing Co., London, pp. 208-211 (1996) [Note: portion re. EVD method], no month listed.

Bergmans, Jan W.M., Digital Baseband Transmission and Recording, Kluwer Academic Publishing Co., Boston, Chapter 3, Appendix 3B, p. 142, (1996) [portion re waterfilling method], no month listed.

3GPP, a standardization group for a Universal Mobile Telecommunicatoins System (UMTS). European IMT-2000 [Specification set for First & Second TxAA modes], no date listed.

G. Golub et al., Matrix Computations, 1998, pp. 208-211, no month listed.

3GPP, TS 25.214 V5.2.Draft (Sep. 2002), Release 5, pp. 43-51.

Brunner, et al., Entitled* pp. 138-142, (Published Nov. 17, 2000), no date listed.

*"Space-Time Eigenrake and Downlink Eigenbeamformer: Exploiting Long-Term and Short-Term Channel Properties in WCDMA", no date listed.

* cited by examiner

MOBILE COMMUNICATION APPARATUS INCLUDING TRANSCEIVING MULTI-ANTENNAS AND MOBILE COMMUNICATION METHOD

BACKGROUND OF THE INVENTION

1. Field of the Invention

The present invention relates to the field of mobile communications. More particularly, the present invention relates to a mobile communication apparatus including a transceiving antenna array, wherein the mobile communication apparatus is capable of minimizing the effect of fading, interference and noise, and a mobile communication method used in the mobile communication apparatus.

2. Description of the Related Art

A next-generation mobile communication system is able to transmit data faster than a current PCS mobile communication system. As a wireless access standard, Europe and Japan have adopted a wideband code division multiple access (W-CDMA) system, which is an asynchronous system, while the North America has adopted a CDMA-2000 (code division multiple access) system, which is a synchronous system.

In a conventional mobile communication system, several mobile stations communicate with one another through a base station. In order to transmit data at a high rate of speed, a mobile communication system should minimize loss due to characteristics of a mobile communication channel, such as fading and user interference. Diversity systems are used to prevent communications from becoming unstable due to fading. For example, a space diversity system, which is a type of diversity system, uses multiple antennas.

Since the use of multiple antennas minimizes the interference between users, a next-generation mobile communication system should use multiple antennas. Among diversity systems that overcome fading using multiple antennas, a multiple transmitting antenna system used to increase the capacity of a transmission terminal, requires significant bandwidth in a transmission direction in view of the characteristics of next-generation mobile communication.

In order to achieve fast data transmission, a conventional mobile communication system should overcome fading, which is one of the channel characteristics having the most serious effect on communication performance, because fading reduces the amplitude of a received signal by several dB or several tens of dB. Fading can be overcome by several diversity techniques. A conventional CDMA system adopts a rake receiver for receiving diverse signals using the delay spread of a channel. A rake receiver performs a diversity reception technique for receiving a multi-path signal. However, the diversity reception technique does not operate when a delay spread is low.

A time diversity system using interleaving and coding is used in a Doppler spread channel. The time diversity system, however, is not suitable for a low-speed Doppler channel. In a room channel with a low delay spread and a pedestrian channel corresponding to a low-velocity Doppler channel, a space diversity system is used to overcome fading. A space diversity system uses at least two antennas. If a signal transmitted via one antenna is attenuated by fading, the space diversity system receives the signal via another antenna. The space diversity system is classified into a reception antenna diversity system using a reception antenna and a transmission antenna diversity system using a transmission antenna. As it is difficult for a mobile station to install the reception antenna diversity system in view of size and costs, it is recommended that a base station use the transmission antenna diversity system.

In the transmission antenna diversity system, there are a closed loop transmission diversity system getting feedback of a downlink channel information from a mobile station to the base station and an open loop transmission diversity system getting no feedback from a mobile station to the base station. In the transmission diversity system, a mobile station searches for an optimal weighted value by measuring the magnitude and phase of a channel. In order to measure the magnitude and phase of a channel, a base station must send different pilot signals for different antennas. A mobile station measures the magnitude and phase of a channel through the pilot signals and searches for an optimal weighted value from the measured channel magnitude and phase information.

Additionally, in the transmission antenna diversity system, if the number of antennas increases, the diversity effect and the signal-to-noise ratio improve. However, the amount of improvement in the diversity effect decreases with an increase in the number of antennas or signal transmission paths used in a base station, that is, with an increase in the degree of diversity. Accordingly, to improve the diversity effect by using a number of antennas is not always preferable. Hence, it is preferable that the number of antennas used in a base station increases to minimize the power of an interference signal and maximize the signal-to-noise ratio of an internal signal, instead of improving the diversity effect.

A transmission adaptive antenna system, which is developed in consideration of a beamforming effect as well as a diversity effect, is referred to as a downlink beamforming system. Here, the beamforming effect minimizes the influence that interference and noise have upon an internal signal. A system using feedback information like a transmission diversity system is referred to as a closed loop downlink beamforming system. The closed loop downlink beamforming system, which uses information fed back from a mobile station to a base station, may degrade the performance of communications by failing to properly reflect changes in channel information if a feedback channel does not have a sufficient bandwidth.

European IMT-2000 standardization group, a 3rd Generation Partnership Project (3GPP) R (Release) 99 version, adopts first and second transmission antenna array (TxAA) modes as a closed loop transmission diversity system for two antennas. Here, the first TxAA mode, which has been proposed by Nokia, feeds only the phase difference between two antennas back. The second TxAA mode, which has been proposed by Motorola, feeds the gains of two antennas as well as their phases back. The first and second TxAA modes are disclosed in the specification set by the 3GPP, a standardization group for a Universal Mobile Telecommunications System (UMTS), which is a European IMT-2000 standard.

The first or second TxAA mode of a closed loop transmission diversity system uses adaptive array antennas and is designed to apply weighted values corresponding to different complex values to the respective adaptive transmission array antennas. The weighted values applied to the adaptive array antennas relate to a transmission channel and can be, for example, w=h* (w and h are vectors). Hereinafter, bold characters indicate vectors, and non-bold characters indicate scalars. Here, h denotes a transmission array channel, and w denotes a transmission array antenna weighted value vector.

Among mobile communication systems, a system using a frequency division duplex (FDD) generally has a transmission channel and a reception channel that have different characteristics from each other, and accordingly must feed transmission channel information back in order to inform a base station of the transmission channel h. To do this, the first or second TxAA mode is designed so that a mobile station obtains the information on the weighted value w to be obtained from the channel information on the channel h and sends the obtained weighted value information to the base station. The first TxAA mode quantizes only a $\theta_2-\theta_1$ part corresponding to a phase component from the information on the weighted value $w(=|w_1|\exp(j\theta_1), |w_2|\exp(j\theta_2))$, where $w_1$ and $w_2$ denote scalars) into two bits and feeds the two bits back. Accordingly, the precision of a phase is $\pi/2$, and a quantization error is $\pi/4$ at the maximum. In order to increase the efficiency of the feedback, the first TxAA mode uses a refining method of updating only one bit out of two feedback bits every moment. For example, a combination of two bits can be $\{b(2k), b(2k-1)\}$ or $\{b(2k), b(2k+1)\}$, where b denotes a bit fed back in units of slots every moment. The second TxAA mode feeds back both a phase and a gain, which are the components of the weighted value information. The phase is fed back three (3) bits at a time, and the gain is fed back one (1) bit at a time. Accordingly, the precision of the phase is $\pi/4$ and a quantization error is $\pi/8$ at the maximum. In order to increase the efficiency of the feedback, the second TxAA mode uses a progressive refining mode for updating only one bit out of the four feedback bits every moment. A refining mode has the specification that each bit becomes an orthogonal basis value, while the progressive refining mode does not set the specification.

The above-described first and second TxAA modes have the following problems when the number of antennas and the characteristics of a space-time channel vary.

If the number of antennas increases, a weighted value for each antenna must be fed back, and hence a significant amount of information to be fed back is created. Thus, depending on the movement speed of a mobile station, the first and second TxAA modes degrade the communication performance. That is, generally, if the movement speed of a mobile station increases in a conventional fading channel, a change in the space-time channel becomes of considerable concern. Thus, the feedback speed of channel information must be increased. However, if the feedback speed is limited, feedback information increasing with an increase in the number of antennas consequently degrades the performance of communications.

If the distance between antennas is not sufficient, the correlation between channels in each antenna increases. If the correlation between channels increases, the information amount of a channel matrix decreases. The effective use of a feedback method prevents performance degradation in a high-speed moving body environment even if the number of antennas increases. However, since the first and second TxAA modes are constructed under the assumption that the channels of two antennas that constitute the space-time channels are completely independent from each other, they cannot be used effectively when the number of antennas and the characteristics of the space-time channel change. In addition, the first and second TxAA modes have never been applied to an environment using more than two (2) antennas and cannot provide excellent performance even when using three (3) or more antennas.

SUMMARY OF THE INVENTION

In an effort to solve the above-described problems, it is a feature of an embodiment of the present invention to provide a mobile communication apparatus including multiple transmission antennas and multiple reception antennas, in which long-term and short-term information having the downlink characteristics of a space channel for every antenna that exists between the mobile station and the base station that include the multiple transmission antennas and the multiple reception antennas, respectively, are fed back from the mobile station to the base station, thereby minimizing the effects of fading, interference, and noise and maximizing throughput.

Another feature of an embodiment of the present invention provides a mobile communication method performed in the mobile communication apparatus having the multiple transmission antennas and the multiple reception antennas.

In order to provide the first feature of an embodiment of the present invention, the present invention provides a mobile communication apparatus for performing communication between a base station and a mobile station. In the mobile communication apparatus, preferably, the base station restores long-term and short-term information determined in consideration of first characteristics in the mobile station from a feedback signal received from the mobile station, spatially processes dedicated physical channel signals using basis information produced from the restored long-term and short-term information, and transmits the results of addition of the spatially-processed signals to pilot signals to the mobile station. The mobile station has at least one transmission antenna, and the base station has at least one reception antenna. The first characteristics are the characteristics of the downlink channels of the respective transmission and reception antennas.

To provide the second feature of an embodiment of the present invention, the present invention provides a mobile communication method of performing communications between a base station having at least one transmission antenna and a mobile station having at least one reception antenna. In the mobile communication method, first, long-term and short-term information determined in consideration of first characteristics, which are the characteristics of the downlink channels of the respective transmission and reception antennas, in the mobile station are restored from a feedback signal received from the mobile station. Then, dedicated physical channel signals are spatially processed using basis information produced from the restored long-term and short-term information. Thereafter, the spatially-processed signals are added to pilot signals, and the sums are transmitted to the mobile station.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
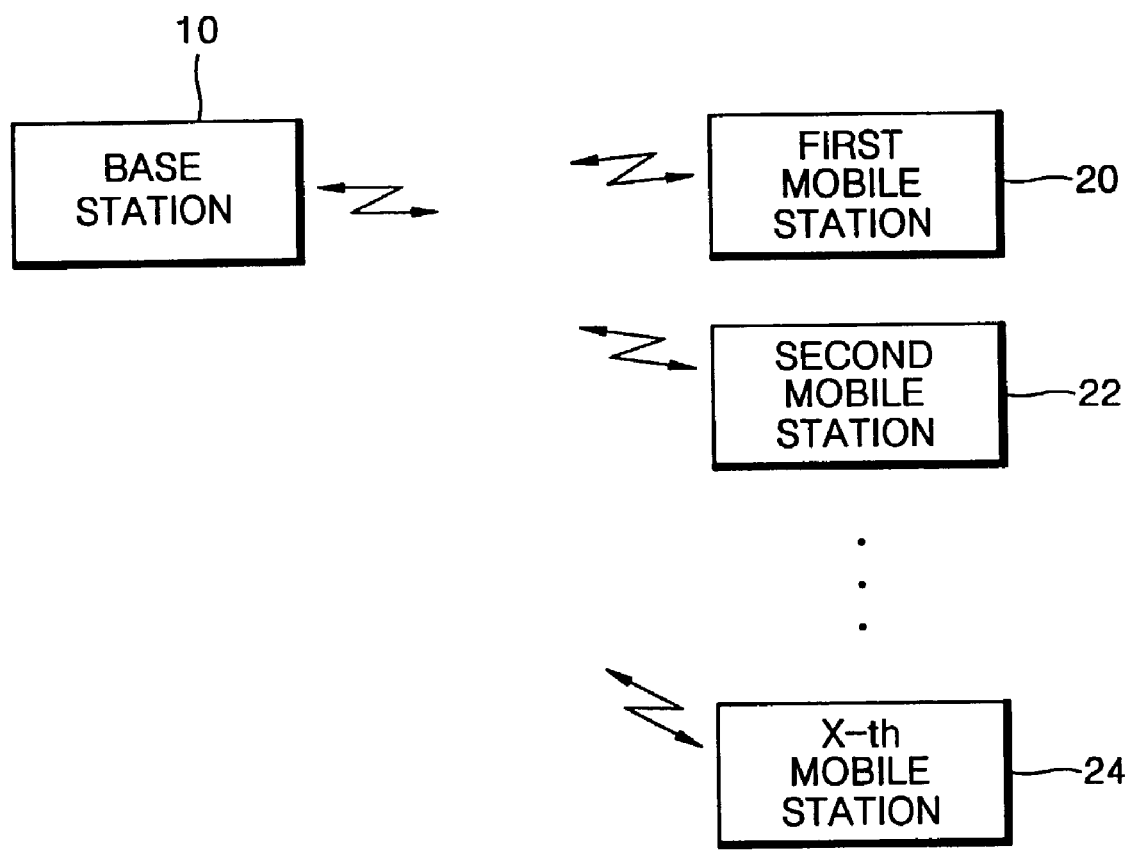
FIG. 1 illustrates a schematic block diagram of a mobile communication apparatus according to an embodiment of the present invention.

Korean Patent Application No. 2001-65670, filed Oct. 24, 2001, and entitled: "Mobile Communication Apparatus Including Transceiving Multi-Antennas and Mobile Communication Method," is incorporated by reference herein in its entirety.

Hereinafter, the structure and operation of a mobile communication apparatus including multiple transmission antennas and multiple reception antennas, according to various embodiments of the present invention, and a mobile communication method according to the present invention performed in this apparatus will be described with reference to the accompanying drawings. Like reference numerals refer to like elements throughout.

Referring to FIG. 1, a mobile communication apparatus according to an embodiment of the present invention includes a base station 10 and first, second, . . . , and X-th mobile stations 20, 22, . . . , and 24.

Figure 2:
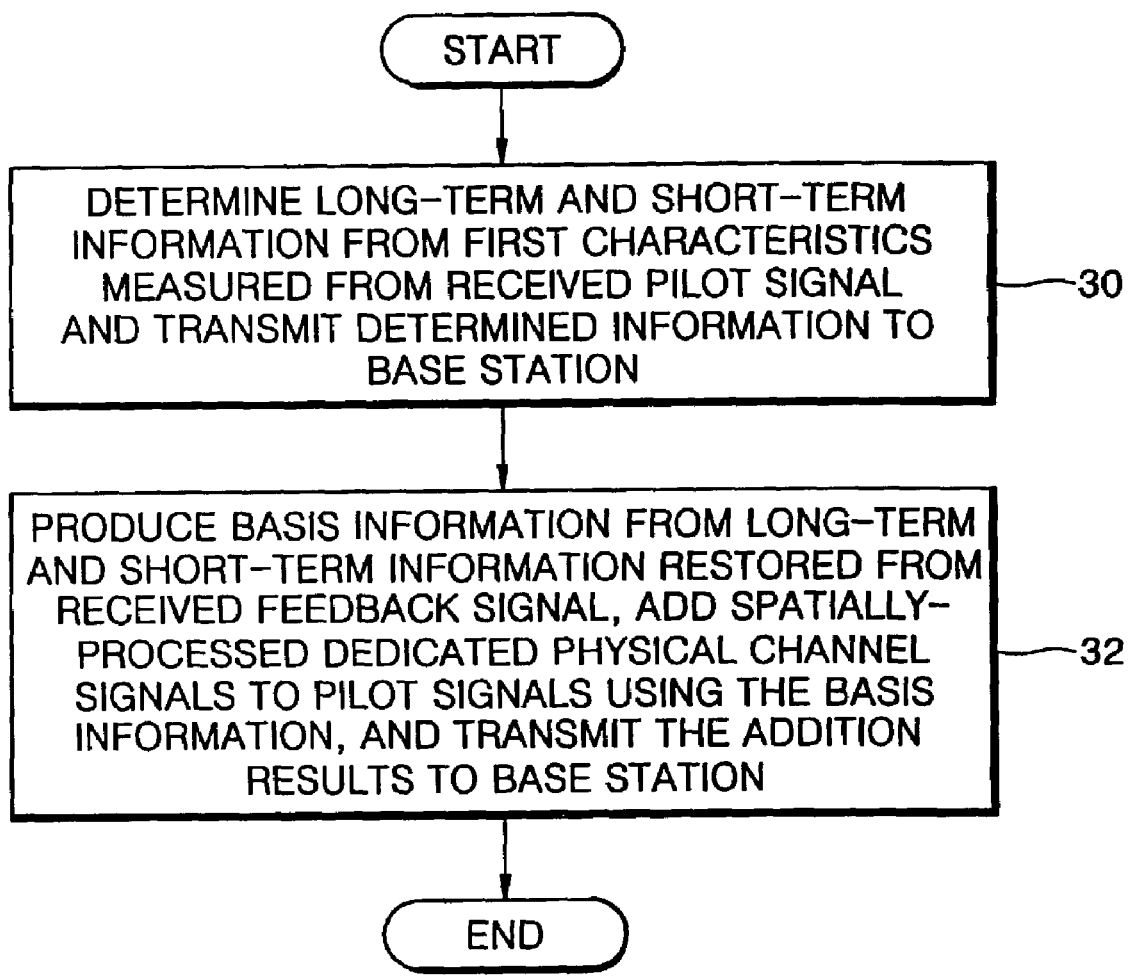
FIG. 2 is a flowchart for illustrating a mobile communication method according to an embodiment of the present invention, performed in the mobile communication apparatus of FIG. 1.

FIG. 2 is a flowchart for illustrating a mobile communication method according to an embodiment of the present invention, performed in the mobile communication apparatus of FIG. 1. This mobile communication method includes step 30 of obtaining a feedback signal and step 32 of adding spatially-processed Dedicated Physical CHannel (DPCH) signals to pilot signals using long-term and short-term information restored from the feedback signal and transmitting the addition results.

The first, second, . . . , and X-th mobile stations 20, 22, . . . , and 24 of FIG. 1 perform the same function and each have at least one reception antenna. The base station 10 has at least one transmission antenna. For example, the first, second, . . . , and X-th mobile stations 20, 22, . . . , and 24 may correspond to terminals.

In step 32, the base station 10 of FIG. 1 restores long-term and short-term information from a feedback signal received from one of the mobile stations 20, 22, . . . , and 24, spatially processes the DPCH signals using basis information produced from the restored long-term and short-term information, adds the spatially-processed DPCH signals to PIlot CHannel (PICH) signals, and transmits the addition results to the mobile station 20, 22, . . . , or 24. Here, the PICH signal $[P_i(k)]$ (where $1 \leq i \leq B$, and B denotes the number of transmission antennas that is a positive integer equal to or greater than 1) may be a common PICH (CPICH) signal, a dedicated CPICH (DCPICH) signal, or a secondary CPICH (SCPICH) signal.

If the base station 10 according to the present invention can perform the operations described above, the mobile stations 20, 22, . . . , and 24 having at least one reception antenna may be implemented into any form. That is, each of the mobile stations 20, 22, . . . , and 24 may be any form if it can determine the long-term and short-term information in consideration of the characteristics (hereinafter, referred to as first characteristics H) of a downlink channel for individual transmission and reception antennas. Here, H denotes a matrix. As before, bold characters denote vectors, and non-bold characters denote scalars. The first characteristics H denote the phase and magnitude of a channel transferred from the base station 10 to a mobile station 20, 22, . . . , or 24. In the first characteristics H, columns are constituted with channels formed by the transmission antennas of the base station 10, and rows are constituted with channels formed by the reception antennas of one of the mobile stations 20, 22, . . . , and 24. That is, the column constituents of the first characteristics H are obtained with respect to the space formed by the transmission antennas, and the row constituents thereof are obtained with respect to the space formed by the reception antennas.

For example, in step 30, each of the first, second, . . . , and X-th mobile stations 20, 22, . . . , and 24 measures the first characteristics H from pilot signals received from the base station 10, determines the long-term and short-term information in which the correlation between channels for respective transmission and reception antennas is reflected, from the measured first characteristics H, transforms the determined long-term and short-term information into a feedback signal, and transmits the feedback signal to the base station 10.

To facilitate understanding of the present invention, step 30 and an embodiment of a mobile station 20, 22, . . . , or 24 will now be described with reference to the corresponding drawings. An embodiment of the base station 10 and step 32 will be described later.

Figure 3:
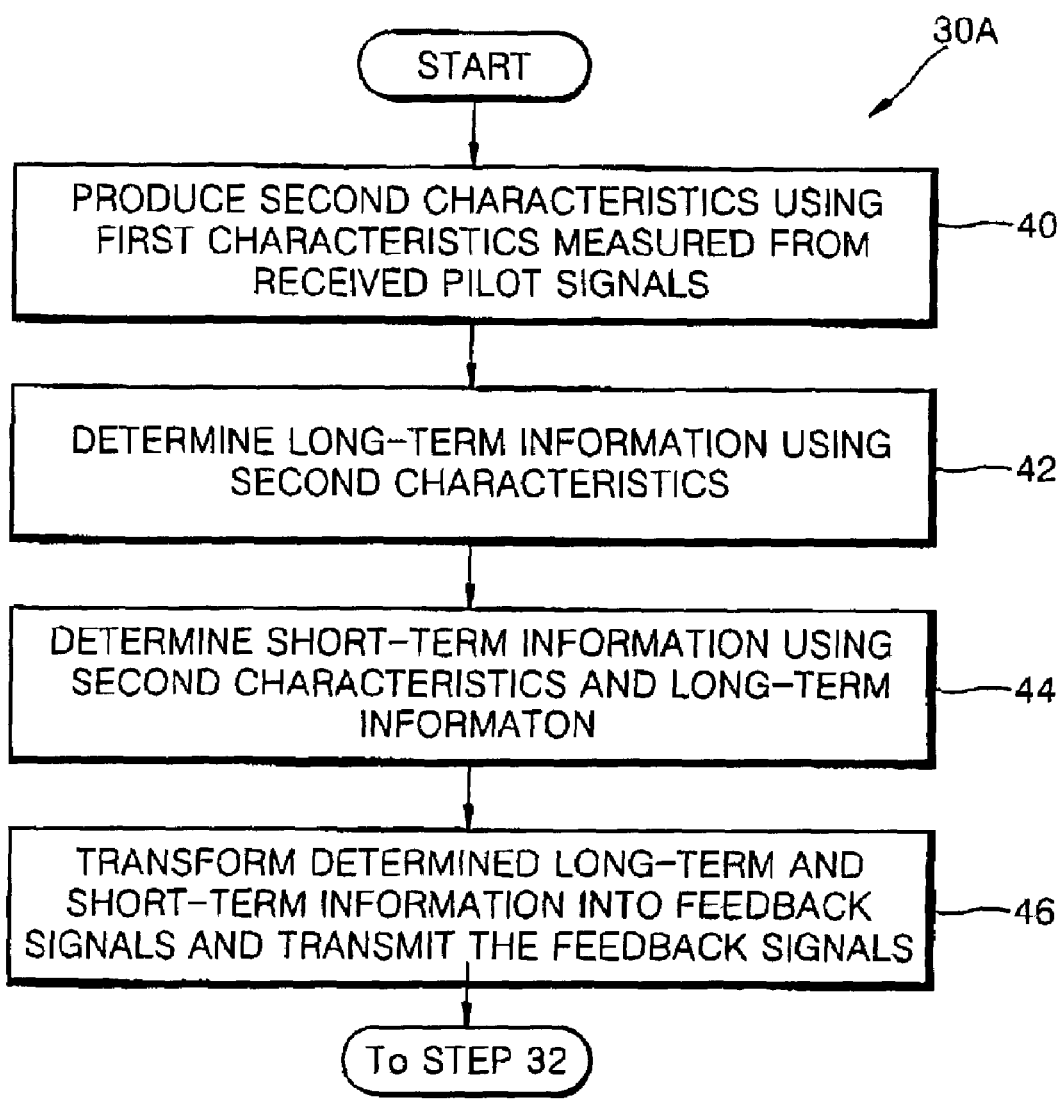
FIG. 3 is a flowchart for illustrating a preferred embodiment of step 30 of FIG. 2.

FIG. 3 is a flowchart for illustrating a preferred embodiment 30A of step 30 of FIG. 2. First, in step 40, the first characteristics H are measured. In steps 42 and 44, respectively, the long-term and short-term information of a channel are determined. In step 46, the determined long-term and short-term information are transformed into feedback signals.

Figure 4:
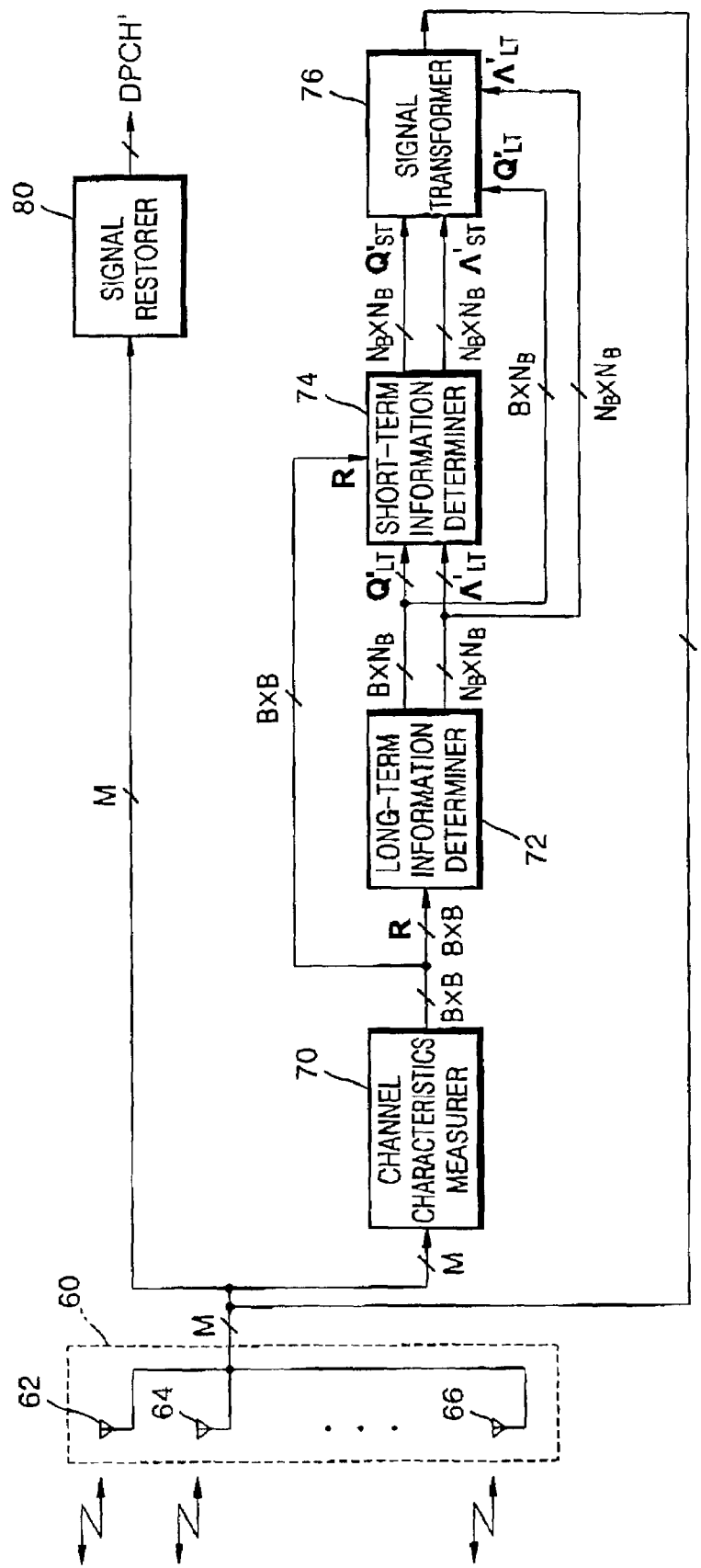
FIG. 4 illustrates a block diagram of a preferred embodiment of the first, second, . . . , or X-th mobile station of FIG. 1.

FIG. 4 illustrates a block diagram of a preferred embodiment of the present invention for the first, second, . . . , or X-th mobile station 20, 22, . . . , or 24 of FIG. 1. Preferably, a mobile station 20, 22, . . . , or 24 includes an antenna array 60, a channel characteristics measurer 70, a long-term information determiner 72, a short-term information determiner 74, a signal transformer 76, and a signal restorer 80.

The antenna array 60 of FIG. 4 has M reception antennas 62, 64, . . . , and 66 and receives the spatially-processed DPCH signals and pilot signals PICH transferred from the base station 10. Here, M denotes a positive integer greater than or equal to 1. Referring back to FIG. 3, in step 40, the channel characteristics measurer 70 measures the first characteristics H from the pilot signals received and transferred via the antenna array 60 from the base station 10, generates the instantaneous correlation characteristics (hereinafter referred to as second characteristics R) of downlink channels for respective transmission and reception antennas from the measured first characteristics H using the following equation 1, and outputs the generated second characteristics R to the long-term information determiner 72 and the short-term information determiner 74. Here, the second characteristics R is a B×B matrix. Equation 1 is as follows:

$$R = H^H \cdot H \tag{1}$$

After step 40, in step 42, the long-term information determiner 72 determines effective long-term eigenvectors $Q'_{LT}$ and effective long-term eigenvalues $\Lambda'_{LT}$ which correspond to the long-term information, from the second characteristics H measured by the channel characteristics measurer 70, and outputs the effective long-term eigenvectors $Q'_{LT}$ and the effective long-term eigenvalues $\Lambda'_{LT}$ to the short-term information determiner 74 and the signal transformer 76. Here, long-term eigenvalues are mapped to long-term eigenvectors in a one-to-one correspondence, and the long-term eigenvectors mapped to the effective long-term eigenvalues correspond to the effective long-term eigenvectors.

An embodiment 42A of step 42 of FIG. 3 and an embodiment 72A of the long-term information determiner 72 of FIG. 4 will now be described with reference to FIGS. 5 and 6, respectively.

Figure 5:
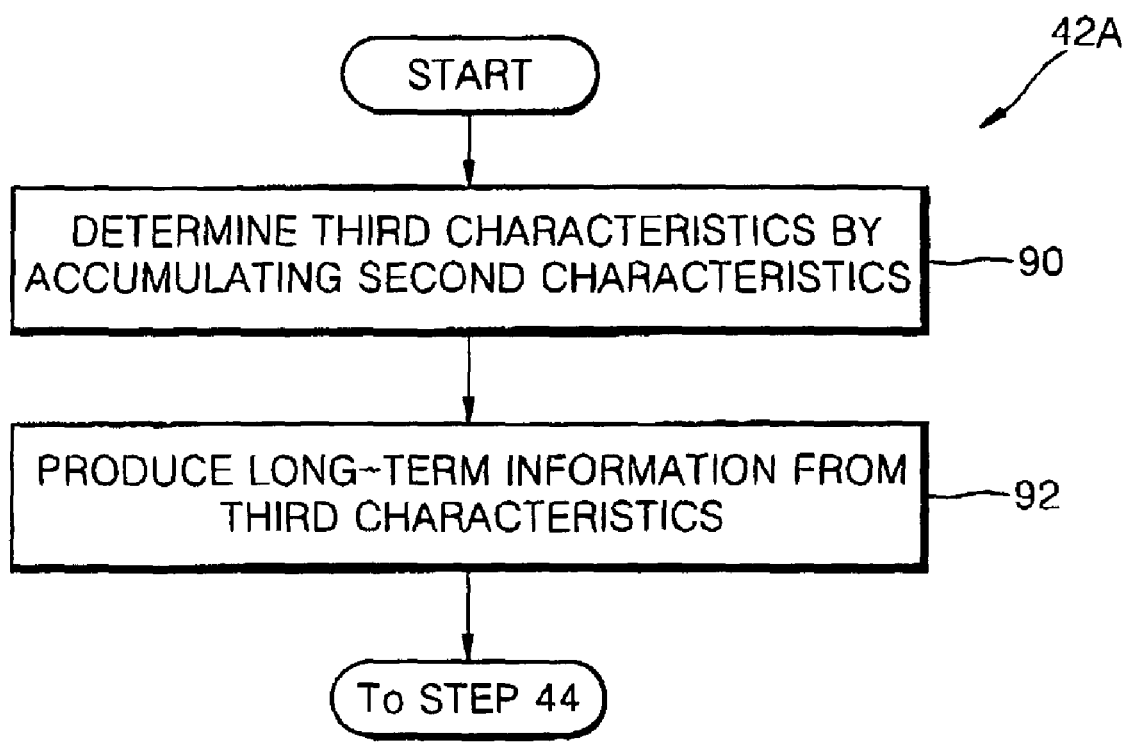
FIG. 5 is a flowchart for illustrating a preferred embodiment of step 42 of FIG. 3.

FIG. 5 is a flowchart for illustrating step 42A, which is an embodiment of step 42 of FIG. 3. Step 42A includes step 90 of determining the long-term correlation characteristics of downlink channels of individual transmission and reception antennas by accumulating the second characteristics R, and step 92 of producing long-term information from the obtained long-term correlation characteristics.

Figure 6:
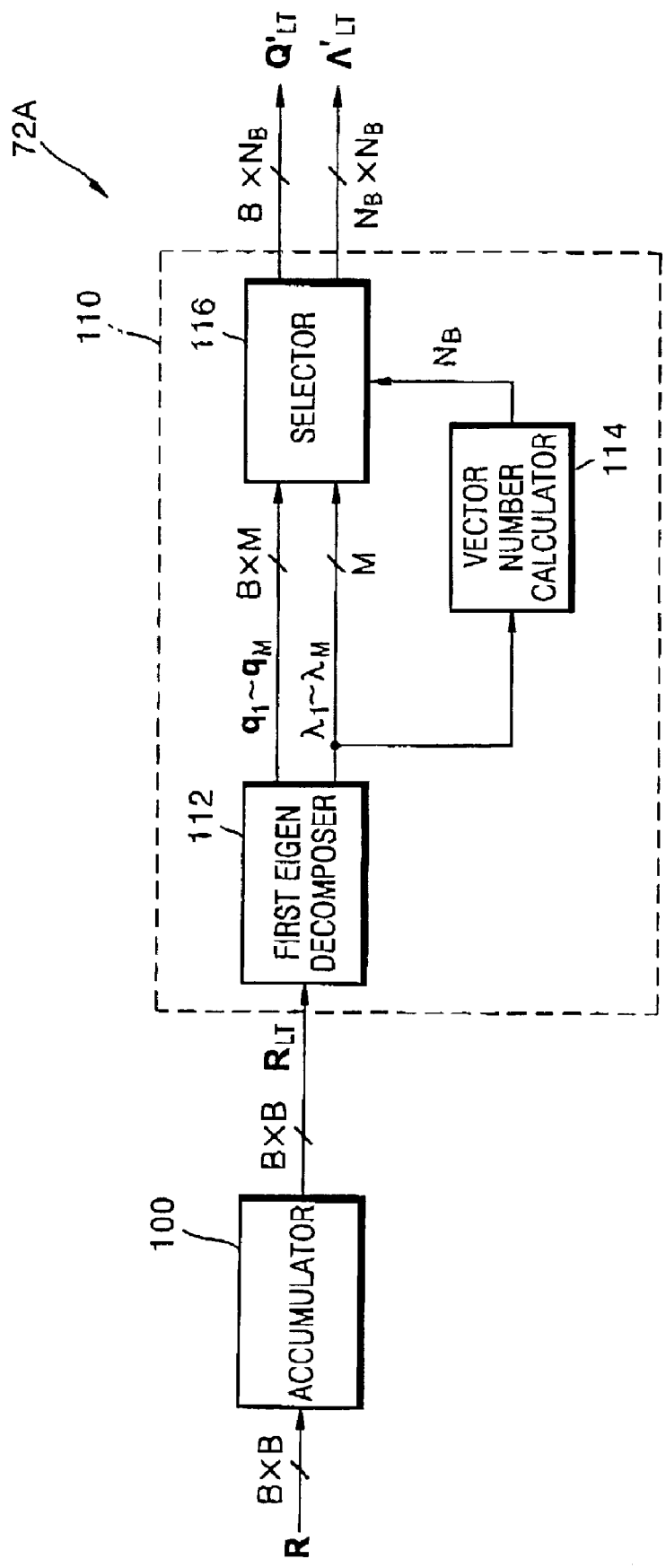
FIG. 6 illustrates a block diagram of an embodiment of the long-term information determiner of FIG. 4.

FIG. 6 illustrates a block diagram of an embodiment 72A of the long-term information determiner 72 of FIG. 4, according to an embodiment of the present invention. The embodiment 72A includes an accumulator 100 and an eigen decomposition calculation unit 110.

Referring to FIGS. 5 and 6, after step 40, in step 90, the accumulator 100 of FIG. 6 accumulates the second characteristics R received from the channel characteristics measurer 70 and outputs the accumulation result $[R_{LT}(k)]$ as the long-term correlation characteristics of the downlink channels of respective transmission and reception antennas (hereinafter referred to as third characteristics $R_{LT}$) to the eigen decomposition calculation unit 110. Here, the third characteristics $R_{LT}$, that is, the accumulated result $[R_{LT}(k)]$, may be expressed as in equation 2:

$$R_{LT} = \Sigma H^H \cdot H = \Sigma R, \text{ that is, } R_{LT}(k) = \rho R_{LT}(k-1) + R(k) \tag{2}$$

wherein ρ denotes a forgetting factor and k denotes a discrete time.

After step 90, in step 92, the eigen decomposition calculation unit 110 produces the effective long-term eigenvectors $Q'_{LT}$ and the effective long-term eigenvalues $\Lambda'_{LT}$, which correspond to the long-term information, from the third characteristics $R_{LT}$ received from the accumulator 100 using an eigen value decomposition (EVD) method, and outputs the same to the short-term determiner 74 and the signal transformer 76.

An embodiment 92A of step 92 of FIG. 5 and the eigen decomposition calculation unit 110 of FIG. 6 will now be described with reference to FIGS. 6 and 7.

Figure 7:
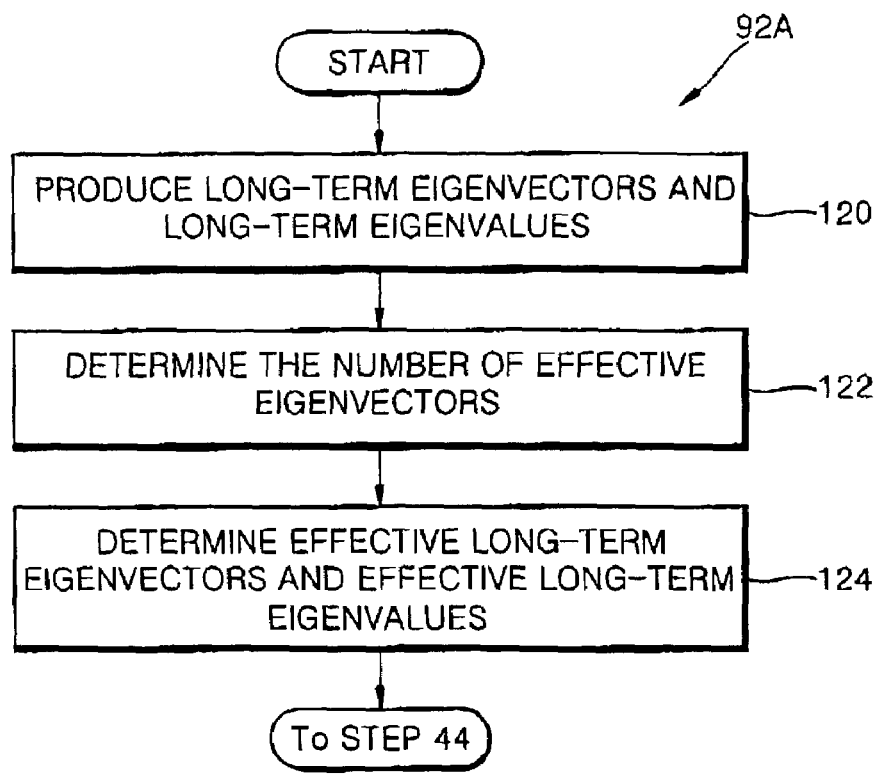
FIG. 7 is a flowchart for illustrating an embodiment of step 92 of FIG. 5, according to an embodiment of the present invention.

FIG. 7 is a flowchart illustrating step 92A, which is an embodiment of step 92 of FIG. 5. Step 92A includes steps 120, 122, and 124 in which effective vectors and effective values are selected among the long-term eigenvectors and the long-term eigenvalues, respectively, as the long-term information.

Referring back to FIG. 6, the eigen decomposition calculation unit 110 can include a first eigen decomposer 112, a vector number calculator 114, and a selector 116, in order to perform step 92A of FIG. 7.

After step 90, in step 120, the first eigen decomposer 112 produces M long-term eigenvectors $q_1$ through $q_m$ and M long-term eigenvalues $\lambda_1$ through $\lambda_M$ from the third characteristics $R_{LT}$ received from the accumulator 100 using the above-described EVD method, outputs the M long-term eigenvalues $\lambda_1$ through $\lambda_M$ to the vector number calculator 114 and the selector 116, and outputs the M long-term eigenvectors $q_1$ through $q_m$ to the selector 116.

After step 120, in step 122, the vector number calculator 114 counts the number of long-term eigenvalues that exceed a predetermined threshold value and outputs the count result as the number of effective eigenvectors, $N_B$, (hereinafter referred to as an effective eigenvector number) to the selector 116. To achieve this, the vector number calculator 114 may be implemented as a counter (not shown). The predetermined threshold value may be a value close to '0'.

After step 122, in step 124, the selector 116 selects a number of noise-removed long-term eigenvectors $q_1$ through $q_{N_B}$ equal to the effective eigenvector number $N_B$ from the M long-term eigenvectors $q_1$ through $q_M$ received from the first eigen decomposer 112 and also selects a number of noise-removed long-term eigenvalues $\lambda_1$ through $\lambda_{N_B}$ equal to the effective eigenvector number $N_B$ from the M long-term eigenvalues $\lambda_1$ through $\lambda_M$ received from the first eigen decomposer 112. The selector 116 outputs column vectors composed of the selected long-term eigenvectors $q_1$ through $q_{N_B}$ as the effective long-term eigenvectors $Q'_{LT}$ and outputs a diagonal matrix composed of the selected M long-term eigenvalues $\lambda_1$ through $\lambda_{N_B}$ as the effective long-term eigenvalues $\Lambda'_{LT}$.

Referring back to FIGS. 3 and 4, after step 42, in step 44, the short-term information determiner 74 determines short-term eigenvectors $Q'_{ST}$ and short-term eigenvalues $\Lambda'_{ST}$, which correspond to short-term information, from the second characteristics R received from the channel characteristics measurer 70 and the long-term information $Q'_{LT}$ and $\Lambda'_{ST}$ received from the long-term information determiner 72, and outputs the determined short-term information to the signal transformer 76.

An embodiment 44A of step 44 of FIG. 3 and an embodiment 74A of the short-term information determiner 74 of FIG. 4 will now be described with reference to FIGS. 8 and 9, respectively.

Figure 8:
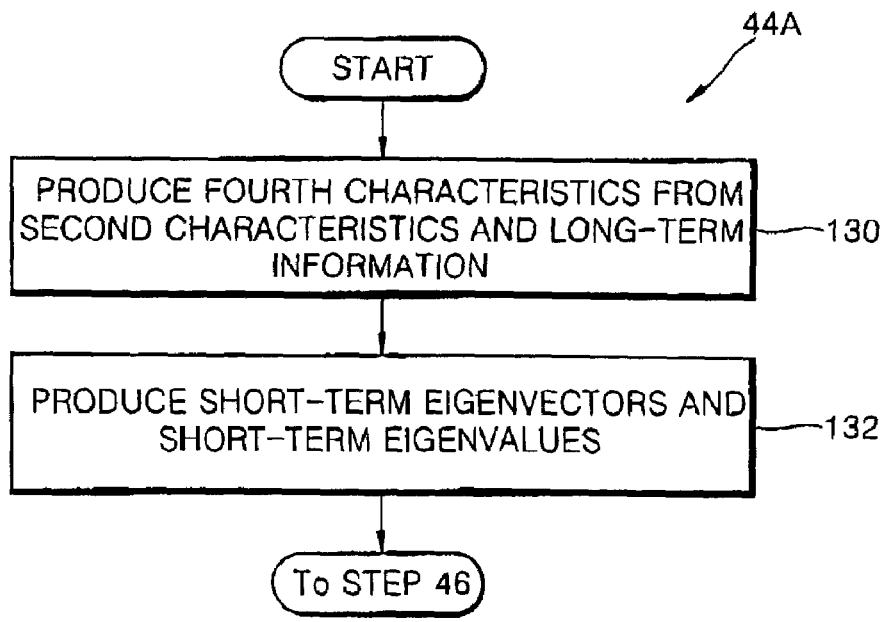
FIG. 8 is a flowchart for illustrating an embodiment of step 44 of FIG. 3, according to an embodiment of the present invention.

FIG. 8 is a flowchart illustrating step 44A, which is an embodiment of step 44 of FIG. 3. Step 44A includes step 130 of producing the short-term correlation characteristics of the downlink channels of respective transmission and reception antennas and step 132 of producing short-term information.

Figure 9:
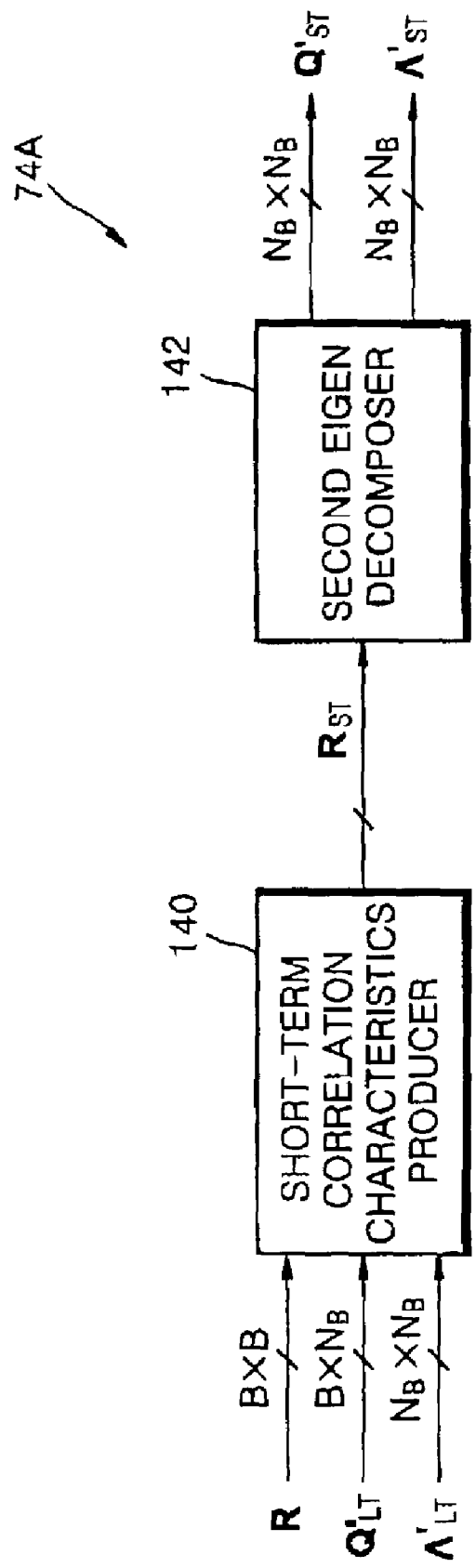
FIG. 9 illustrates a block diagram of an embodiment of the short-term information determiner of FIG. 4, according to an embodiment of the present invention.

FIG. 9 is a block diagram of an embodiment 74A of the short-term information determiner 74 of FIG. 4. The embodiment 74A includes a short-term correlation characteristics producer 140 and a second eigen decomposer 142.

After step 42, in step 130, the short-term correlation characteristics producer 140 produces the short-term correlation characteristics (hereinafter referred to as fourth characteristics $R_{ST}$) of the downlink channels of respective transmission and reception antennas using the second characteristics R received from the channel characteristics measurer 70 and the long-term information $Q'_{LT}$ and $\Lambda'_{LT}$ received from the long-term information determiner 72 using equation 3:

$$R_{ST} = \Lambda'^{\frac{H}{2}}_{LT} Q'^{H}_{LT} R Q'_{LT} \Lambda'^{\frac{1}{2}}_{LT} \qquad (3)$$

Still in step 130, the short-term correlation characteristics producer 140 outputs the fourth characteristics $R_{ST}$ to the second eigen decomposer 142.

After step 130, in step 132, the second eigen decomposer 142 produces the short-term eigenvectors $Q'_{ST}$ and the short-term eigenvalues $\Lambda'_{ST}$ from the fourth characteristics $R_{ST}$ received from the short-term correlation characteristics producer 140 using the above-described EVD method and outputs them to the signal transformer 76.

Referring back to FIGS. 3 and 4, after step 44, in step 46, the signal transformer 76 transforms the short-term information $Q'_{ST}$ and $\Lambda'_{ST}$ received from the short-term information determiner 74 and the long-term information $Q'_{LT}$ and $\Lambda'_{LT}$ received from the long-term information determiner 72 into a feedback signal suitable to be fed back to the base station 10, and transfers the feedback signal to the base station 10 through the antenna array 60.

To perform step 46, the signal transformer 76 formats the long-term information $Q'_{LT}$ and $\Lambda'_{LT}$ and the short-term information $Q'_{ST}$ and $\Lambda'_{ST}$ received from the long-term and short-term information determiners 72 and 74, respectively, performs time-division multiplexing (TDM) on the formatted information, and transfers the TDM result as a feedback signal to the basis station 10 through the antenna array 60. According to an embodiment of the present invention, the signal transformer 76 may perform code-division multiplexing or frequency-division multiplexing instead of the time-division multiplexing in order to obtain a feedback signal.

According to the present invention, each of the mobile stations 20, 22, . . . , and 24 may further include the signal restorer 80, as shown in FIG. 4. At a point in time when steps 40 through 46 are performed, the signal restorer 80 restores the original DPCH signals from the DPCH signals spatially processed by the base station 10 and received via the antenna array 60 and outputs restored DPCH signals DPCH'.

An embodiment 32A of step 32 of FIG. 2 and an embodiment of the present invention of the base station 10 of FIG. 1 will now be described with reference to FIGS. 10 and 11, respectively.

Figure 10:
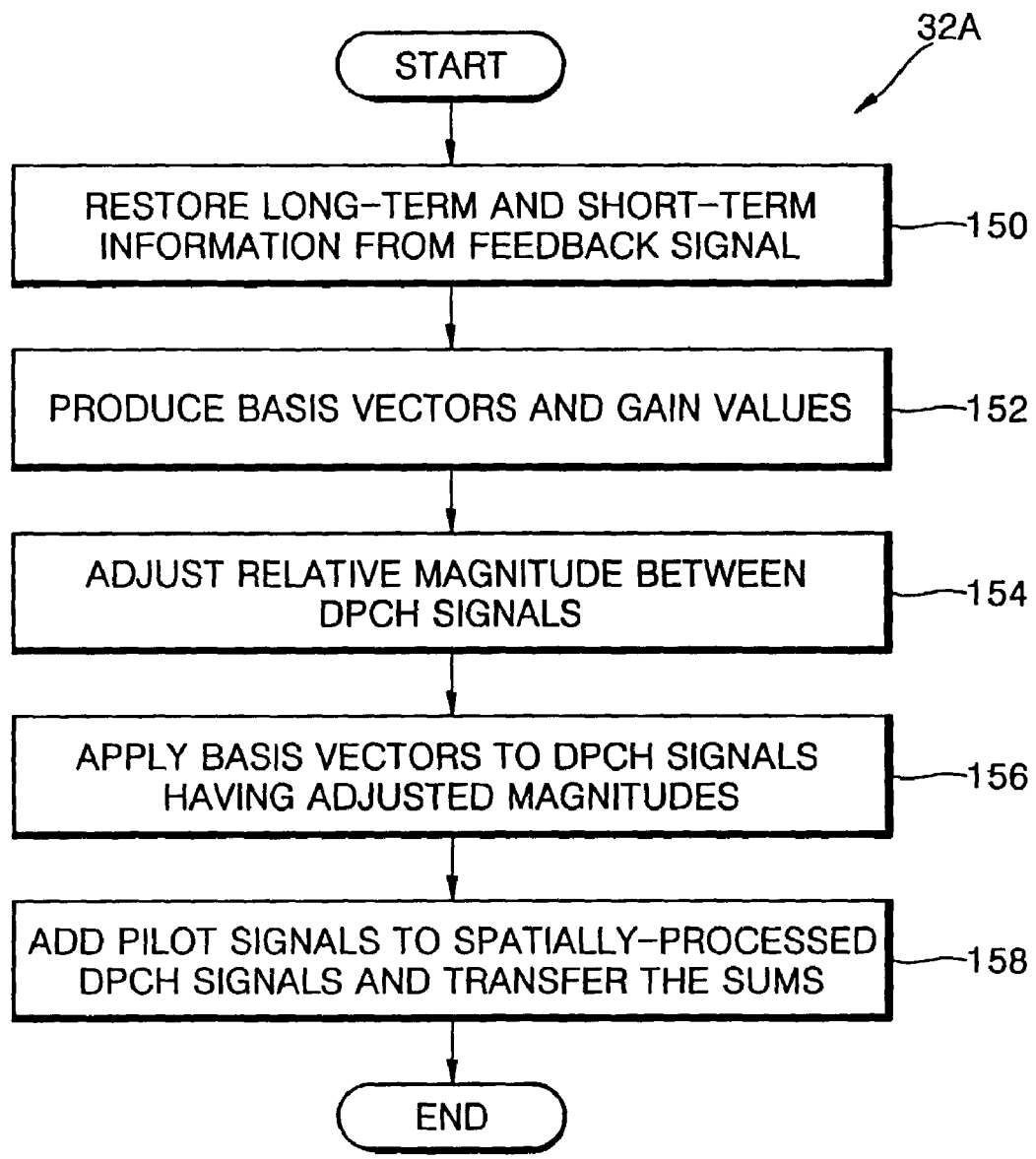
FIG. 10 is a flowchart for illustrating a preferred embodiment of step 32 of FIG. 2.

Referring to FIG. 10, step 32A, which is an embodiment of step 32 of FIG. 2, includes steps 150 through 156 of spatially processing DPCH signals using restored long-term and short-term information and step 158 of adding the spatially-processed DPCH signals to pilot signals.

Figure 11:
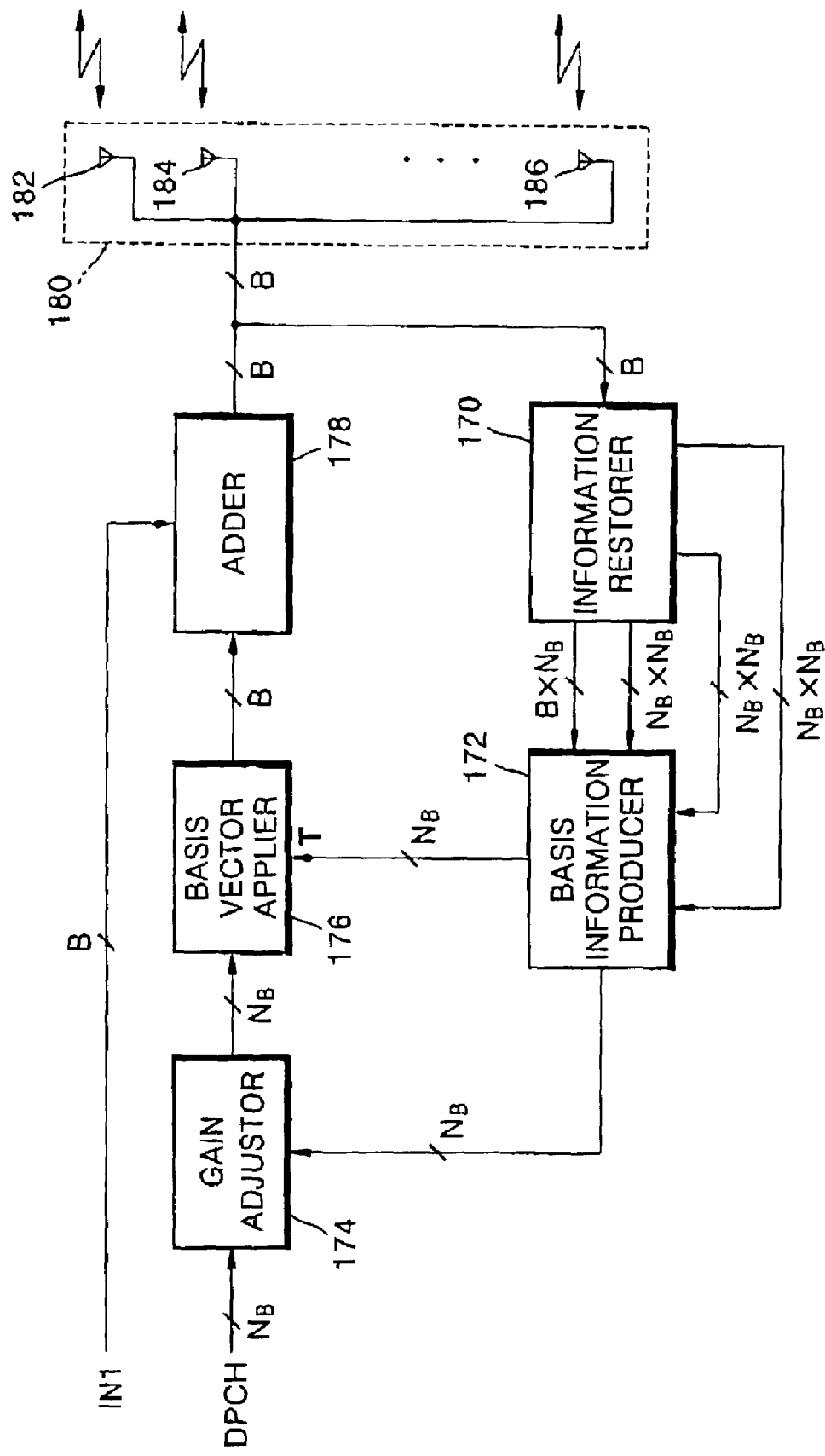
FIG. 11 illustrates a block diagram of an embodiment of the base station of FIG. 1, according to an embodiment of the present invention.

Referring to FIG. 11, an embodiment of the base station 10 of FIG. 1 includes an information restorer 170, a basis information producer 172, a gain adjuster 174, a basis vector applier 176, an adder 178, and an antenna array 180.

The antenna array 180 of FIG. 11 has B transmission antennas 182, 184, . . . , and 186, and receives a feedback signal, via an uplink Dedicated Physical Control CHannel (DPCCH), transferred from the mobile station 20, 22, . . . , or 24 and transfers the spatially-processed DPCH signals and the pilot signals to the mobile station 20, 22, . . . , or 24.

After step 30 of FIG. 2, in step 150, first, the information restorer 170 restores the long-term and short-term information from the feedback signal received via the antenna array 180 and outputs the restored long-term and short-term information to the basis information producer 172.

If the signal transformer 76 of FIG. 4 has produced a feedback signal using a time-division multiplexing technique, the information restorer 170 restores the long-term and short-term information using the time-division multiplexing technique. On the other hand, if the signal transformer 76 of FIG. 4 has produced a feedback signal using a code-division multiplexing technique or a frequency-division multiplexing technique instead of a time-division multiplexing technique, the information restorer 170 restores the long-term and short-term information using the code-division de-multiplexing technique or the frequency-division de-multiplexing technique.

After step 150, in step 152, the basis information producer 172 produces basis vectors T and basis values D, which are basis information, from the long-term and short-term information restored by the information restorer 170, produces gain values from the produced basis values D, and outputs the produced gain values to the gain adjustor 174 and the produced basis vectors T to the basis vector applier 176.

An embodiment 152A of step 152 of FIG. 10 and an embodiment 172A of the basis information producer 172 of FIG. 11 will now be described with reference to FIGS. 12 through 14.

Figure 12:
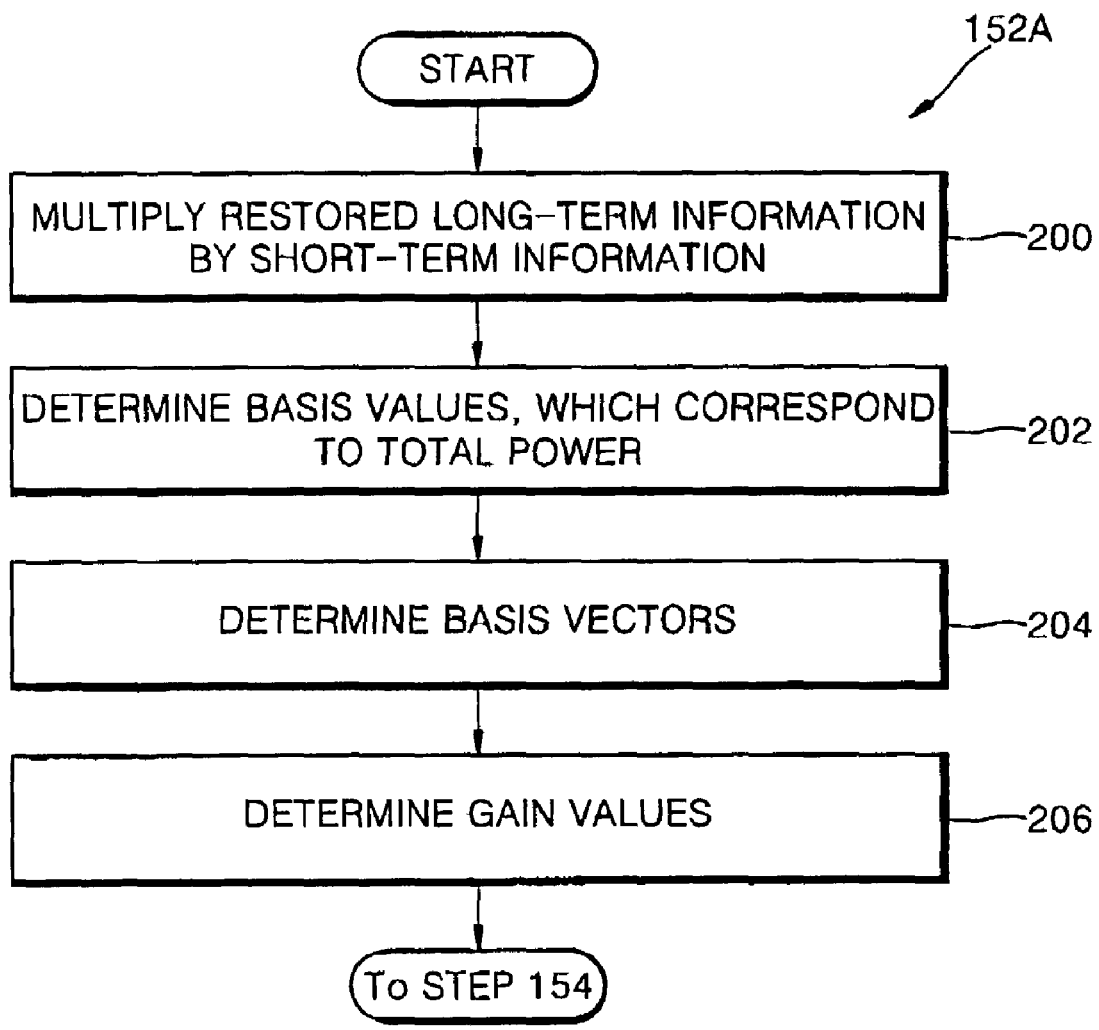
FIG. 12 is a flowchart for illustrating an embodiment of step 152 of FIG. 10.

FIG. 12 is a flowchart illustrating step 152A, which is an embodiment of step 152 of FIG. 10. Step 152A includes steps 200 through 206 of determining the basis vectors T and the gain values from the result of multiplication of the restored long-term and short-term information.

Figure 13:
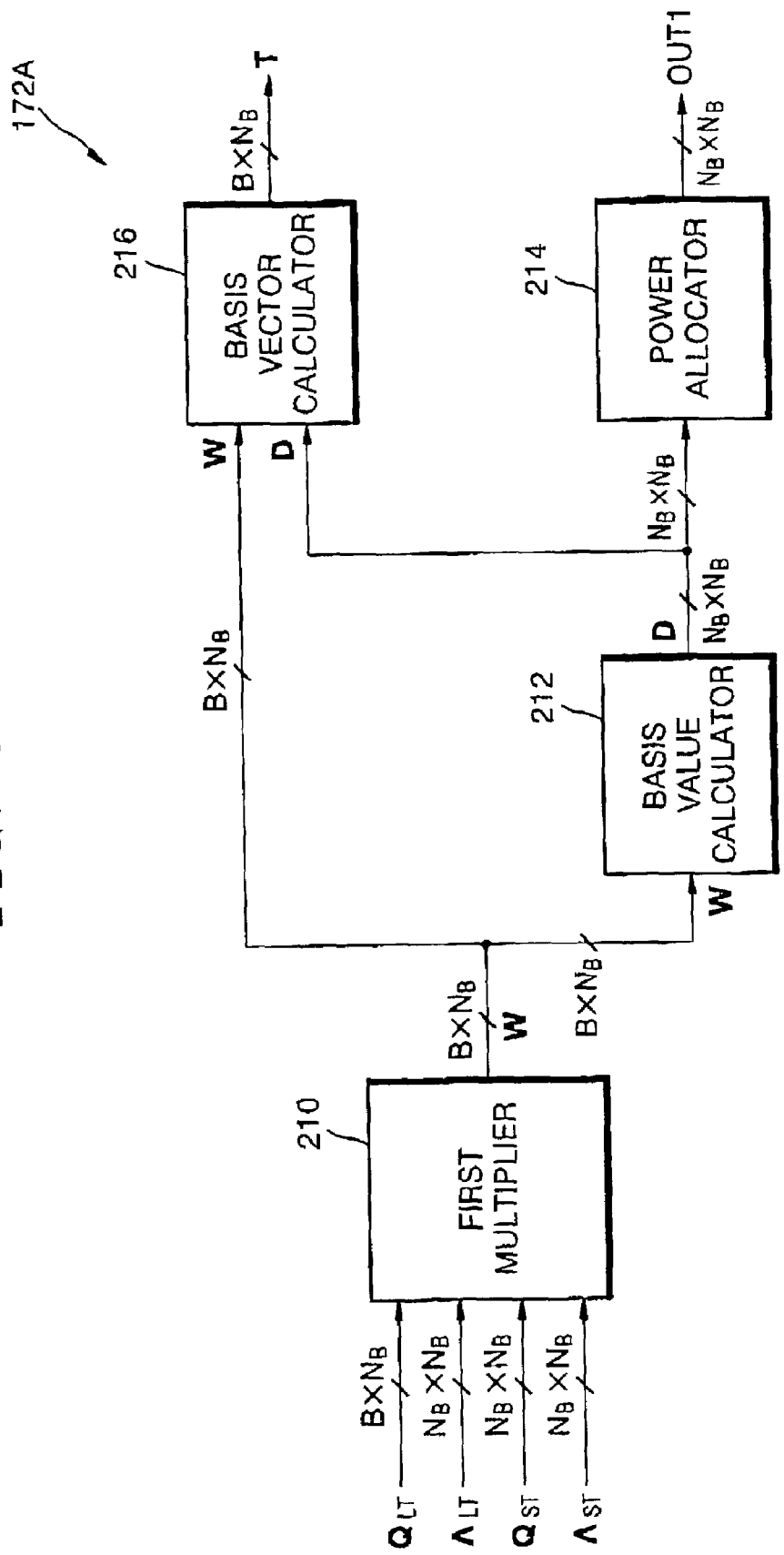
FIG. 13 illustrates a block diagram of an embodiment of the basis information producing unit of FIG. 11.

FIG. 13 illustrates a block diagram of an embodiment 174A of the present invention of the basis information producer 172 of FIG. 11. The embodiment 174A includes a first multiplier 210, a basis value calculator 212, a power allocator 214, and a basis vector calculator 216.

After step 150, in step 200, the first multiplier 210 multiplies the restored long-term information and the restored short-term information, which were restored by the information restorer 170 as shown in equation 4, and outputs the multiplication result W to the basis value calculator 212 and the basis vector calculator 216. Equation 4 is as follows:

$$W = Q_{LT} \Lambda_{LT}^{1/2} Q_{ST} \Lambda_{ST}^{1/2} \qquad (4)$$

wherein $Q_{LT}$ and $\Lambda_{LT}$ denote the restored effective long-term eigenvectors and the restored effective long-term eigenvalues, respectively, which are long-term information restored by the information restorer 170. $Q_{ST}$ and $\Lambda_{ST}$ denote the restored short-term eigenvectors and the restored short-term eigenvalues, respectively, which are short-term information restored by the information restorer 170.

After step 200, in step 202, the basis value calculator 212 calculates a total of power to be allocated to channels from the multiplication result W obtained by the first multiplier 210 and outputs the calculated total power as basis values D to the power allocator 214 and the basis vector calculator 216.

Figure 14:
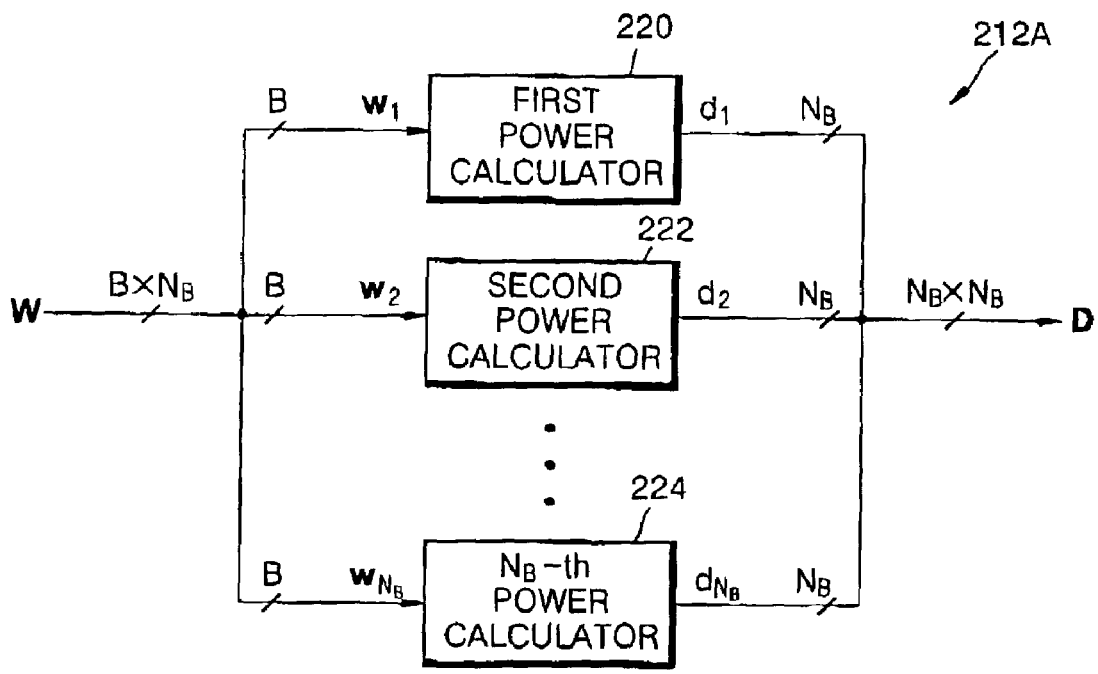
FIG. 14 illustrates a block diagram of a preferred embodiment of the basis value calculator of FIG. 13.

FIG. 14 illustrates a block diagram of a basis value calculator 212A, which is an embodiment of the basis value calculator 212 of FIG. 13. The basis value calculator 212A includes first, second, . . . , and $N_B$-th power calculators 220, 222, . . . , and 224.

To perform step 202, the first, second, . . . , and $N_B$-th power calculators 220, 222, . . . , and 224 of the basis value calculator 212A apply a norm to the multiplication result W received from the first multiplier 210 and outputs the resultant norm as the total power D. The multiplication result W is expressed as in equation 5:

$$W = [w_1 w_2 w_3 \ldots w_{N_B}] \quad (5)$$

That is, an n-th (where $1 \leq n \leq N_B$) power calculator applies a norm to a corresponding $w_n$ among the multiplication result W received from the first multiplier 210 as shown in equation 6 and outputs the resultant norm as n-th power $d_n$. Equation 6 is as follows:

$$d_n = \|w_n\| \quad (6)$$

wherein $\| \;\|$ denotes a norm, $w_n$ denotes a column vector as expressed in equation 7, and $\|w_n\|$ is expressed as in equation 8:

$$w_n = [w_{n1} w_{n2} w_{n3} \ldots w_{nN_B}] \quad (7)$$

$$\|w_n\| = \sqrt{|w_{n1}|^2 + |w_{n2}|^2 + \ldots |w_{nN_B}|^2} \quad (8)$$

The first through $N_B$ power $d_{n1}, d_{n2}, \ldots,$ and $d_{N_B}$ are the total power D as expressed in equation 9:

$$D = \begin{bmatrix} d_1 & 0 & \bullet & 0 \\ 0 & d_2 & \bullet & 0 \\ \bullet & \bullet & \bullet & \bullet \\ 0 & 0 & \bullet & d_{N_B} \end{bmatrix} \quad (9)$$

After step 202, in step 204, the basis vector calculator 216 divides the multiplication result W obtained by the first multiplier 210 by the basis values D received from the basis value calculator 212 and outputs the division results as basis vectors T to the basis vector applier 176.

Figure 15:
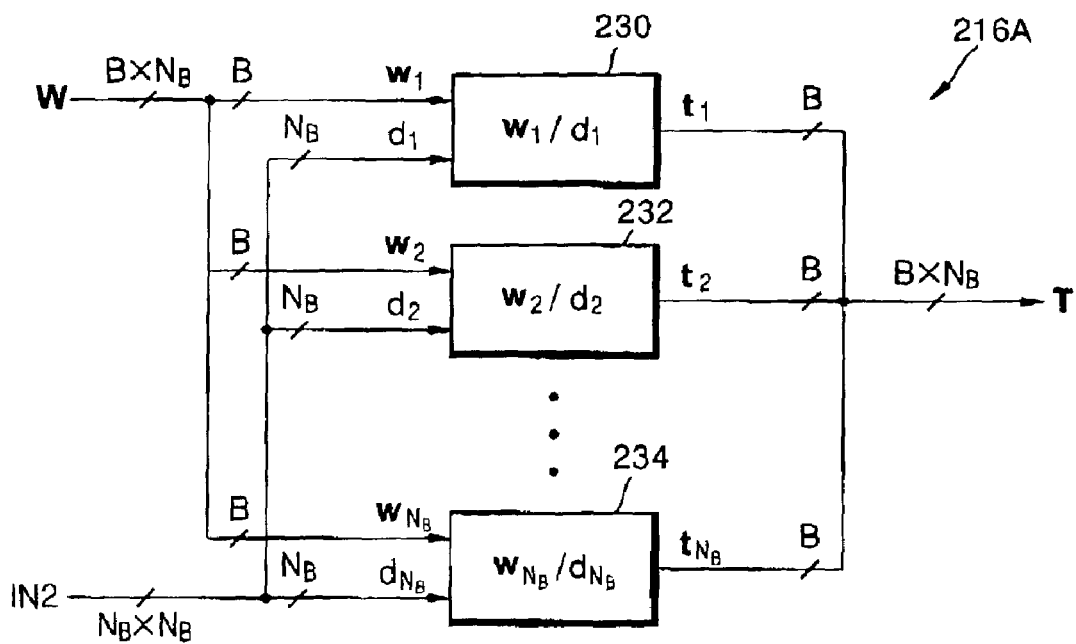
FIG. 15 illustrates a block diagram of an embodiment of the basis vector calculator of FIG. 13.

FIG. 15 illustrates a block diagram of a basis vector calculator 216A, which is an embodiment of the basis vector calculator 216 of FIG. 13. The basis vector calculator 216A includes first through $N_B$-th subvector calculators 230, 232, ..., and 234.

The first through $N_B$-th subvector calculators 230, 232, ..., and 234 divide the multiplication result W received from the first multiplier 210 by the total power D received via an input port IN2 from the basis value calculator 212 and outputs the division result as the basis vectors T. That is, an n-th subvector calculator divides a corresponding vector $w_n$ from the multiplication result W received from the first multiplier 210 by the n-th power $d_n$ received via the input port IN2 from the basis value calculator 212 and outputs the division result as a basis vector $t_n$. For example, the first subvector calculator 230 divides the $w_1$ received from the first multiplier 210 by the first power $d_1$ received via the input port IN2 from the basis value calculator 212 and outputs the division result as a basis vector $t_1$. The second subvector calculator 232 divides the $w_2$ received from the first multiplier 210 by the second power $d_2$ received via the input port IN2 from the basis value calculator 212 and outputs the division result as a basis vector $t_2$. The $N_B$-th subvector calculator 234 divides the $w_{N_B}$ received from the first multiplier 210 by the $N_B$-th power $d_{N_B}$ received via the input port IN2 from the basis value calculator 212 and outputs the division result as a basis vector $t_{N_B}$.

After step 204, in step 206, the power allocator 214 allocates the total power D received from the basis value calculator 212 to individual channels based on a signal-to-noise ratio (SNR) and outputs information on the allocation results as gain values via an output port OUT1 to the gain adjustor 174. To do this, the power allocator 214 can produce gain values from the basis values D using a water filling method.

According to the present invention, in contrast with FIG. 12, steps 204 and 206 may be performed at the same time, or step 206 may be performed before step 204.

After step 152, in step 154, the gain adjustor 174 adjusts the relative magnitude between DPCH signals depending on the gain values received from the basis information producer 172 and outputs magnitude-adjusted DPCH signals to the base vector applier 176.

An embodiment 154A of step 154 of FIG. 10 and an embodiment 174A of the gain adjustor 174 of FIG. 11 will now be described with reference to FIGS. 16 and 17, respectively.

Figure 16:
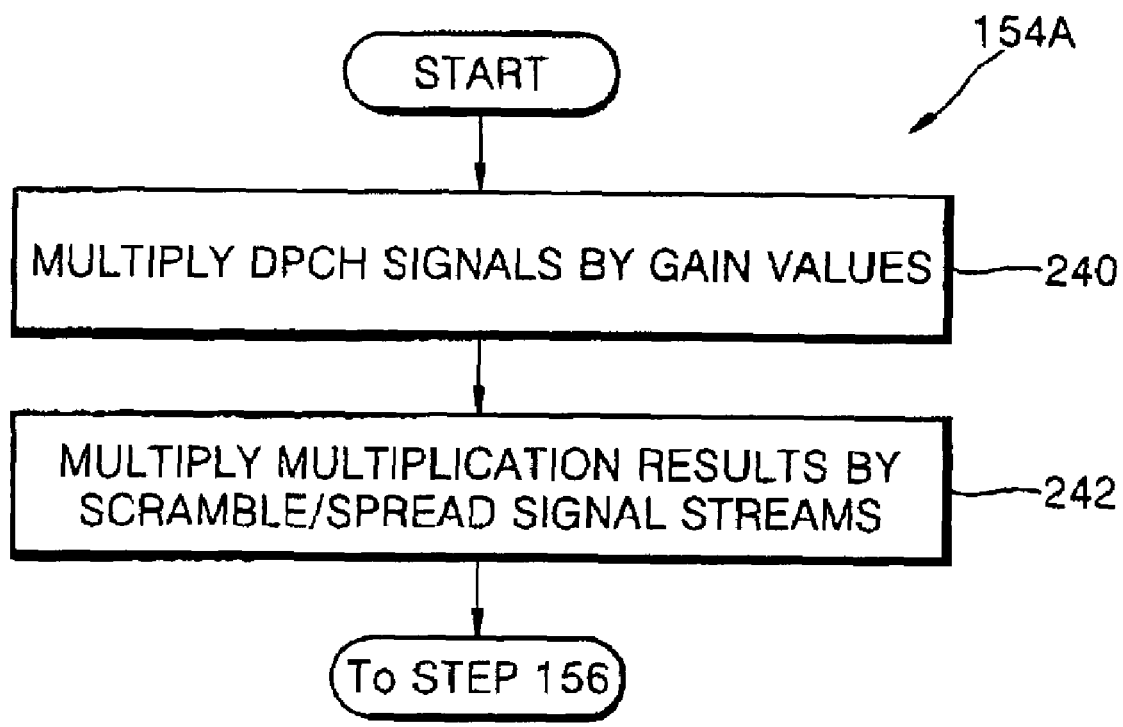
FIG. 16 is a flowchart for illustrating an embodiment of step 154 of FIG. 10.

FIG. 16 is a flowchart illustrating step 154A, which is an embodiment of step 154 of FIG. 10. Step 154A includes step 240 of adjusting the magnitudes of the DPCH signals and step 242 of spreading and scrambling magnitude-adjusted DPCH signals.

Figure 17:
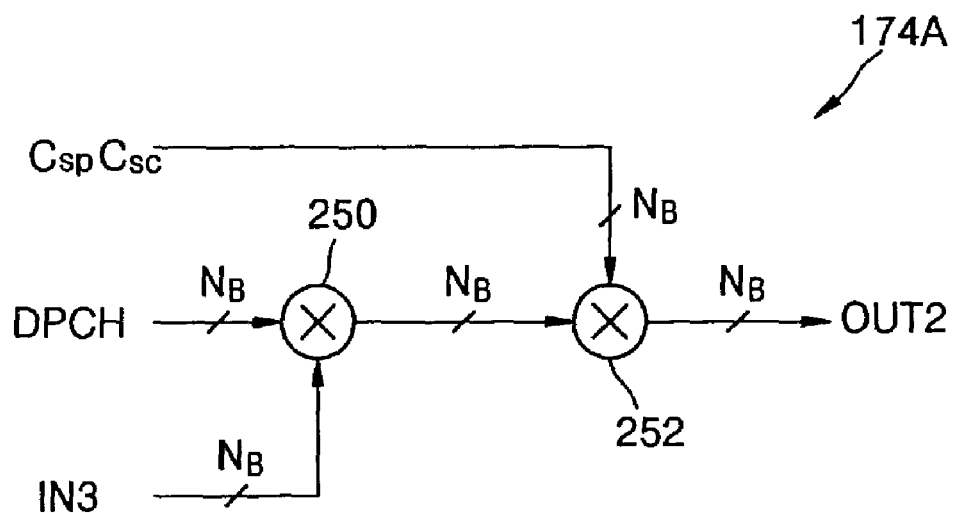
FIG. 17 illustrates a block diagram of an embodiment of the gain adjustor of FIG. 11.

FIG. 17 illustrates a block diagram of a gain adjustor 174A, which is an embodiment of the gain adjustor 174 of FIG. 11. The gain adjustor 174A includes second and third multipliers 250 and 252.

In step 240, the second multiplier 250 of FIG. 17 multiplies the DPCH signals by the gain values received from the basis information producer 172 via an input port IN3 and outputs the multiplication results to the third multiplier 252. After step 240, in step 242, the third multiplier 252 multiplies the multiplication result obtained by the second multiplier 250 by scramble/spread signal streams and outputs the products as magnitude-adjusted DPCH signals via an output port OUT2 to the basis vector applier 176. The scramble/spread signal streams denote the results of multiplication of a scramble signal stream Csc and a spread signal stream Csp, CspCsc, and may be pre-stored in the gain adjustor 174 or input from an external source.

According to the present invention, the gain adjustor 174A of FIG. 17 may selectively include the third multiplier 252. If step 242 is omitted, that is, if the gain adjustor 174A does not include the third multiplier 252, the second multiplier 250 outputs the multiplication result as magnitude-adjusted DPCH signals to the basis vector applier 176.

After step 154, in step 156, the basis vector applier 176 applies the basis vectors T received from the basis information producer 172 to the magnitude-adjusted DPCH signals received from the gain adjustor 174 and outputs the application results as the spatially-processed DPCH signals to the adder 178.

Figure 18:
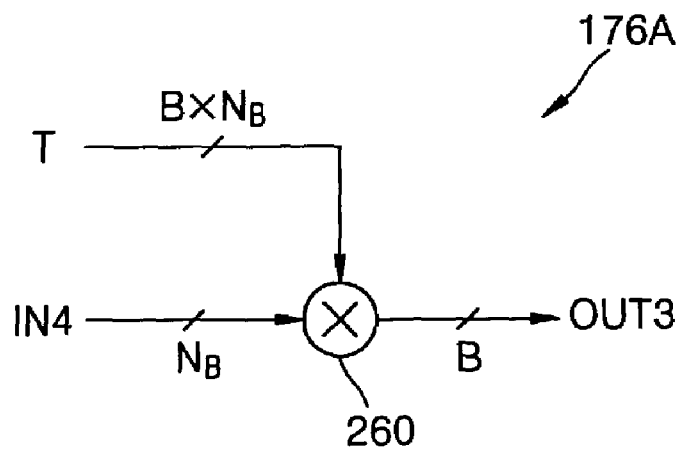
FIG. 18 illustrates a block diagram of an embodiment of the basis vector applying unit of FIG. 11.

FIG. 18 illustrates a block diagram of a basis vector applier 176A, which is an embodiment of the basis vector applier 176 of FIG. 11. The basis vector applier 176A includes a fourth multiplier 260.

To perform step 156, the fourth multiplier 260 of the basis vector applier 176 multiplies the $N_B$ magnitude-adjusted DPCH signals received from the gain adjustor 174 via an input port IN4 by the basis vectors T received from the basis information producer 172 and outputs the multiplication results as the spatially-processed DPCH signals the adder 178 via an output port OUT3.

After step 156, in step 158, the adder 178 adds pilot signals $P_1(k), P_2(k), P_3(k), \ldots,$ and $P_B(k)$ received via the input port IN1 to the spatially-processed DPCH signals received from the basis vector applier 176 and transfers the addition results to a mobile station 20, 22, ..., or 24 via the antenna array 180 including transmission antennas.

In order to perform step 158, the adder 178 may include B adding units (not shown). Each of the adding units (not shown) adds a corresponding signal $P_1(k), P_2(k), P_3(k), \ldots,$ or $P_B(k)$ to a corresponding spatially-processed DPCH signal received from the basis vector applier 176 and outputs the addition result to a corresponding transmission antenna 182, 184, . . . , or 186 in the antenna array 180. The transmission antennas 182, 184, . . . , and 186 transmit the addition results obtained by a corresponding addition unit (not shown) in the adder 178 to the corresponding mobile station 20, 22, . . . , or 24.

The base station 10 of FIG. 1, step 32 of FIG. 2, and their embodiments are not limited to mobile stations 20, 22, . . . , and 24 of FIG. 1, step 30 of FIG. 2, and their embodiments, but they may be applied to any mobile station that can produce long-term and short-term information and transmit a feedback signal to the base station 10 as described above.

As described above, in a mobile communication apparatus having transmission/reception multiple antennas and a mobile communication method performed in the mobile communication apparatus according to the present invention, long-term and short-term information in which the downlink characteristics of a space channel has been reflected is fed back from the mobile stations to the base station. This minimizes the effects of fading, interference, and noise and maximizes throughput.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A mobile communication apparatus having multiple transmission antennas and multiple reception antennas, the apparatus comprising:

a base station for restoring long-term and short-term information determined in consideration of first characteristics in a mobile station from a feedback signal received from the mobile station, spatially processing dedicated physical channel signals using basis information produced from the restored long-term and short-term information, and transmitting the results of addition of the spatially-processed signals to pilot signals to the mobile station; and the mobile station having at least one transmission antenna, wherein the base station has at least one reception antenna and the first characteristics are the characteristics of the downlink channels of the respective transmission and reception antennas.

2. The mobile communication apparatus as claimed in claim 1, wherein the mobile station measures the first characteristics from the pilot signals received from the base station, determines the long-term and short-term information from the first characteristics, transforms the determined long-term and short-term information into the feedback signal, and transmits the feedback signal to the base station.

3. The mobile communication apparatus as claimed in claim 2, wherein the base station comprises:

an information restorer for restoring the long-term and short-term information from the feedback signal received via the transmission antenna, and outputting the restored long-term and short-term information;

a basis information producer for producing basis vectors and basis values, which are basis information, from the long-term and short-term information and producing gain values from the basis values;

a gain adjustor for adjusting relative magnitude between dedicated physical channel signals in response to the gain values and outputting the adjustment results;

a basis vector applier for applying the basis vectors to the adjustment results received from the gain adjustor and outputting the application results as the spatially-processed signals; and an adder for adding the pilot signals to the spatially-processed signals and outputting the addition results, wherein the transmission antennas transmit the addition results to the mobile station.

4. The mobile communication apparatus as claimed in claim 3, wherein the basis information producer comprises:

a first multiplier for multiplying the restored long-term information by the restored short-term information and outputting the multiplication result;

a basis value calculator for calculating a total of power to be allocated to a channel from the multiplication result obtained by the first multiplier and outputting the total power as the basis values;

a basis vector calculator for dividing the multiplication result obtained by the first multiplier by the basis values and outputting the division result as the basis vectors; and a power allocator for allocating the total power to each of the channels based on a signal-to-noise ratio and outputting information on the allocation results as the gain values.

5. The mobile communication apparatus as claimed in claim 4, wherein the first multiplier multiplies the restored long-term information by the restored short-term information as in the following equation and outputs the multiplication result W to the basis value calculator and the basis vector calculator:

$$W = Q_{LT} \Lambda_{LT}^{1/2} Q_{ST} \Lambda_{ST}^{1/2}$$

wherein $Q_{LT}$ and $\Lambda_{LT}$ denote restored effective long-term eigenvectors and restored effective long-term eigenvalues, respectively, which are the restored long-term information, and $Q_{ST}$ and $\Lambda_{ST}$ denote restored short-term eigenvectors and restored short-term eigenvalues, respectively, which are the restored short-term information.

6. The mobile communication apparatus as claimed in claim 4, wherein the basis value calculator includes first, second, . . . , and $N_B$-th power calculators (where $N_B$ denotes the number of effective eigenvectors), an n-th (where $1 \leq n \leq N_B$) power calculator takes a norm of a corresponding $w_n$ among the multiplication result $W(W=[w_1 w_2 w_3 \ldots w_{N_B}])$ obtained by the first multiplier and outputs the resultant norm as n-th power, and the first through $N_B$-th power constitute the total power.

7. The mobile communication apparatus as claimed in claim 6, wherein the basis vector calculator comprises first through $N_B$-th subvector calculators, and an n-th subvector calculator divides $w_n$ by the n-th power and outputs the division result as the basis vector.

8. The mobile communication apparatus of claim 4, wherein the power allocator produces the gain values from the basis values using a water filling method.

9. The mobile communication apparatus of claim 3, wherein the gain adjustor comprises a second multiplier for multiplying the dedicated physical channel signals by the gain values and outputting the multiplication results as the adjustment results to the basis vector applier.

10. The mobile communication apparatus as claimed in claim 9, wherein the gain adjustor further comprises a third multiplier for multiplying the multiplication result obtained by the second multiplier by scramble/spread signal streams and outputting the product as the adjustment result to the basis vector applier.

11. The mobile communication apparatus as claimed in claim 3, wherein the basis vector applier further comprises a fourth multiplier for multiplying the basis vectors by the adjustment results received from the gain adjustor and outputting the multiplication results as the spatially-processed signals to the adder.

12. The mobile communication apparatus as claimed in claim 3, wherein the mobile station comprises:
  a channel characteristics measurer for measuring the first characteristics from the pilot signals received via the reception antennas and producing second characteristics from the measured first characteristics;
  a long-term information determiner for determining effective long-term eigenvectors and effective long-term eigenvalues, which are the long-term information, from the second characteristics received from the channel characteristics measurer;
  a short-term information determiner for determining short-term eigenvectors and short-term eigenvalues, which are the short-term information, from the second characteristics received from the channel characteristics measurer and the long-term information; and
  a signal transformer for transforming the long-term and short-term information received from the long-term information determiner and the short-term information determiner, respectively, into the feedback signal and outputting the feedback signal to the reception antennas,
  wherein the second characteristics are instantaneous correlation characteristics of the downlink channels of the respective transmission and reception antennas, and the reception antennas transmit the feedback signal to the base station.

13. The mobile communication apparatus as claimed in claim 12, wherein the mobile station further comprises a signal restorer for restoring the dedicated physical channel signals from the spatially-processed signals received from the reception antennas and outputting the restored dedicated physical channel signals.

14. The mobile communication apparatus as claimed in claim 12, wherein the long-term information determiner comprises:
  an accumulator for accumulating the second characteristics received from the channel characteristics measurer and outputting the accumulation results as third characteristics; and
  an eigen decomposition calculation unit for producing the effective long-term eigenvectors and the effective long-term eigenvalues from the third characteristics using an eigen value decomposition method,
  wherein the third characteristics are long-term correlation characteristics of the downlink channels of the respective transmission and reception antennas.

15. The mobile communication apparatus as claimed in claim 14, wherein the eigen decomposition calculation unit comprises:
  a first eigen decomposer for producing long-term eigenvectors and long-term eigenvalues from the third characteristics using the eigen value decomposition method;
  a vector number calculator for counting the number of long-term eigenvalues that exceed a predetermined threshold value and outputting the count result as the number of effective eigenvectors; and
  a selector for selecting noise-removed long-term eigenvectors and noise-removed long-term eigenvalues from the long-term eigenvectors and the long-term eigenvalues, respectively, received from the first eigen decomposer, and outputting the selected eigenvectors and eigenvalues as the effective long-term eigenvectors and eigenvalues,
  wherein the number of selected noise-removed long-term eigenvectors is the same as the number of effective eigenvectors, and the number of selected noise-removed long-term eigenvalues is the same as the number of effective eigenvectors.

16. The mobile communication apparatus as claimed in claim 12, wherein the short-term determiner comprises:
  a short-term correlation characteristics producer for producing fourth characteristics from the second characteristics received from the channel characteristics measurer and the long-term information and outputting the produced fourth characteristics; and
  a second eigen decomposer for producing the short-term eigenvectors and the short-term eigenvalues from the fourth characteristics using an eigen value decomposition method and outputting the produced short-term eigenvectors and eigenvalues,
  wherein the fourth characteristics are short-term correlation characteristics of the downlink channels of the respective transmission and reception antennas.

17. A mobile communication method of performing communications between a base station having at least one transmission antenna and a mobile station having at least one reception antenna, the method comprising:
  (a) restoring from a feedback signal received from the mobile station long-term and short-term information determined in the mobile station in consideration of first characteristics, which are the characteristics of the downlink channels of the respective transmission and reception antennas, spatially processing dedicated physical channel signals using basis information produced from the restored long-term and short-term information, and transmitting the results of addition of the spatially-processed signals to pilot signals to the mobile station.

18. The mobile communication method as claimed in claim 17, further comprising (b) measuring the first characteristics from the pilot signals received from the base station, determining the long-term and short-term information from the first characteristics, transforming the determined long-term and short-term information into the feedback signal, and transmitting the feedback signal to the base station.

19. The mobile communication method as claimed in claim 18, wherein (a) comprises:
  (a1) restoring the long-term and short-term information from the feedback signal received via the transmission antenna;
  (a2) producing basis vectors and basis values, which are basis information, from the restored long-term and short-term information and producing gain values from the basis values;

(a3) adjusting relative magnitude between the dedicated physical channel signals using the gain values;

(a4) applying the basis vectors to the adjustment results and determining the application results to be the spatially-processed signals; and (a5) adding the pilot signals to the spatially-processed signals and transmitting the addition results via the transmission antenna to the mobile station.

20. The mobile communication method as claimed in claim 19, wherein (a2) comprises:

(a21) multiplying the restored long-term information by the restored short-term information, after (a1);

(a22) calculating a total of power to be allocated to a channel from the multiplication result and determining the total power to be the basis values;

(a23) dividing the multiplication result by the basis values and determining the division result to be the basis vectors; and (a24) allocating the total power to each of the channels based on a signal-to-noise ratio, determining information on the allocation result to be the gain values, and proceeding to (a3).

21. The mobile communication method as claimed in claim 20, wherein in (a21), after (a1), the restored long-term information is multiplied by the restored short-term information as in the following equation to obtain the multiplication result W, and the method proceeds to (a22):

$$W = Q_{LT} \Lambda_{LT}^{1/2} Q_{ST} \Lambda_{ST}^{1/2}$$

wherein $Q_{LT}$ and $\Lambda_{LT}$ denote restored effective long-term eigenvectors and restored effective long-term eigenvalues, respectively, which are the restored long-term information, and $Q_{ST}$ and $\Lambda_{ST}$ denote restored short-term eigenvectors and restored short-term eigenvalues, respectively, which are the restored short-term information.

22. The mobile communication method as claimed in claim 19, wherein after (a2), (a3) comprises:

(a31) multiplying the dedicated physical channel signals by the gain values, determining the multiplication results to be the adjustment results, and proceeding to (a4).

23. The mobile communication method as claimed in claim 22, wherein (a3) further comprises:

(a32) multiplying the multiplication result obtained in (a31) by scramble/spread signal streams, determining the product to be the adjustment results, and proceeding to (a4).

24. The mobile communication method as claimed in claim 19, wherein after (a3), (a4) comprises multiplying the basis vectors by the adjustment results, determining the multiplication result to be the spatially-processed signals, and proceeding to (a5).

25. The mobile communication method as claimed in claim 19, wherein (b) comprises:

(b1) measuring the first characteristics from the pilot signals received via the reception antenna and producing second characteristics from the measured first characteristics;

(b2) determining effective long-term eigenvectors and effective long-term eigenvalues, which are the long-term information, from the second characteristics;

(b3) determining effective short-term eigenvectors and effective short-term eigenvalues, which are the short-term information, from the second characteristics and the long-term information; and (b4) transforming the long-term and short-term information determined in (b2) and (b3) into the feedback signal and transmitting the feedback signal via the reception antenna to the base station, wherein the second characteristics are instantaneous correlation characteristics of the downlink channels of the respective transmission and reception antennas.

26. The mobile communication method as claimed in claim 25, wherein (b) further comprises restoring the dedicated physical channel signals from the spatially-processed signals received from the reception antenna.

27. The mobile communication method as claimed in claim 25, wherein (b2) comprises:

(b21) accumulating the second characteristics and determining the accumulation results to be third characteristics, after (b1); and (b22) producing the effective long-term eigenvectors and the effective long-term eigenvalues from the third characteristics using an eigen value decomposition method, wherein the third characteristics are long-term correlation characteristics of the downlink channels of the respective transmission and reception antennas.

28. The mobile communication method as claimed in claim 27, wherein (b22) comprises:

producing long-term eigenvectors and long-term eigenvalues from the third characteristics using the eigen value decomposition method, after (b21);

counting the number of long-term eigenvalues that exceed a predetermined threshold value and determining the count result as the number of effective eigenvectors; and selecting noise-removed long-term eigenvectors and noise-removed long-term eigenvalues from the long-term eigenvectors and the long-term eigenvalues, respectively, determining the selected eigenvectors and eigenvalues as the effective long-term eigenvectors and eigenvalues, respectively, and proceeding to (b3), wherein the number of selected noise-removed long-term eigenvectors is the same as the number of effective eigenvectors, and the number of selected noise-removed long-term eigenvalues is the same as the number of effective eigenvectors.

29. The mobile communication method as claimed in claim 25, wherein (b3) comprises:

producing fourth characteristics from the second characteristics and the long-term information, after (b2); and producing the short-term eigenvectors and the short-term eigenvalues from the fourth characteristics using an eigen value decomposition method and proceeding to (b4), wherein the fourth characteristics are short-term correlation characteristics of the downlink channels of the respective transmission and reception antennas.

* * * * *